March 26, 1935. A. G. F. WALLGREN 1,995,408
BEARING
Filed May 20, 1932    2 Sheets-Sheet 1
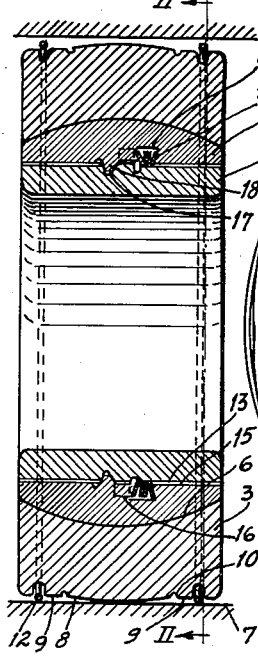
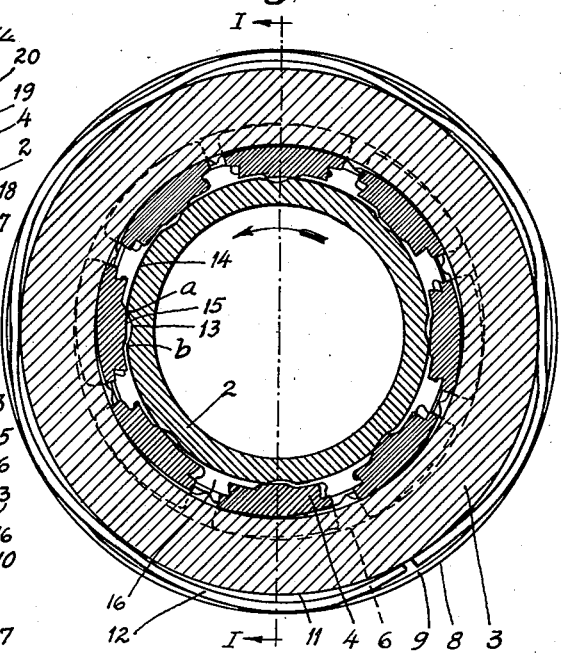
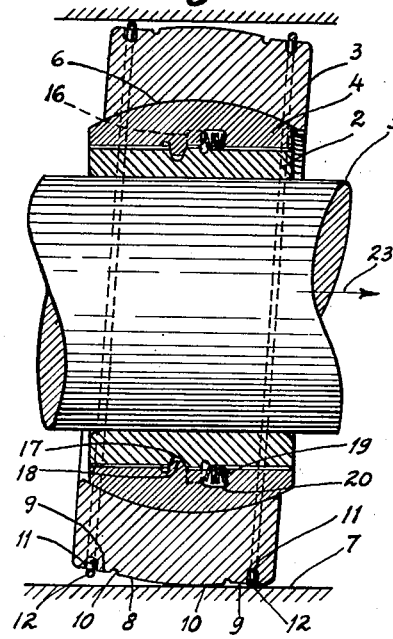
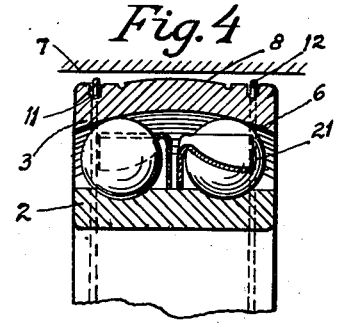
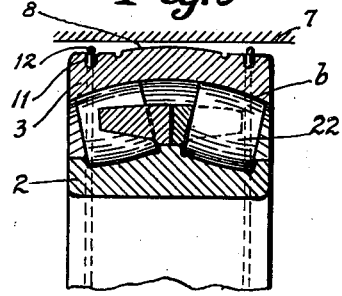
INVENTOR
August Gunner Ferdinand Wallgren
BY
Wm T. Hedlund
his ATTORNEY March 26, 1935.  A. G. F. WALLGREN  1,995,408
BEARING
Filed May 20, 1932  2 Sheets-Sheet 2
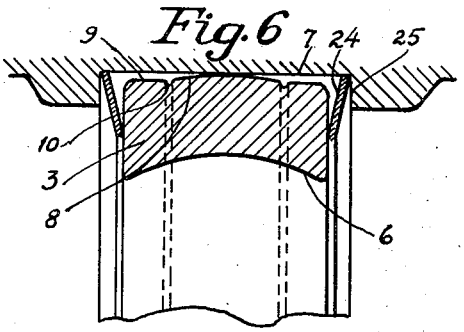
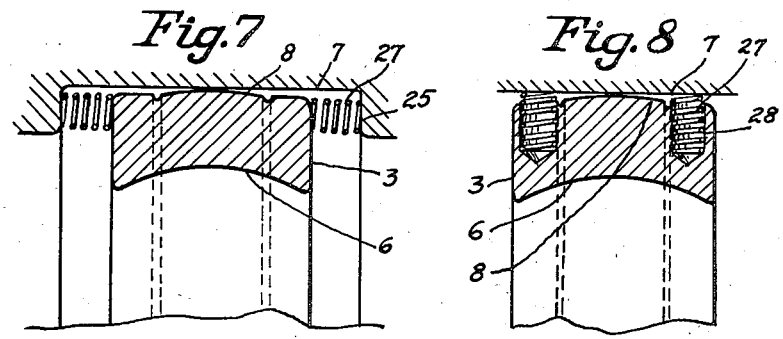
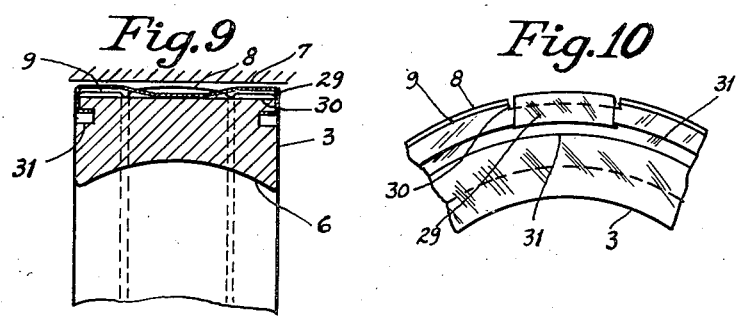
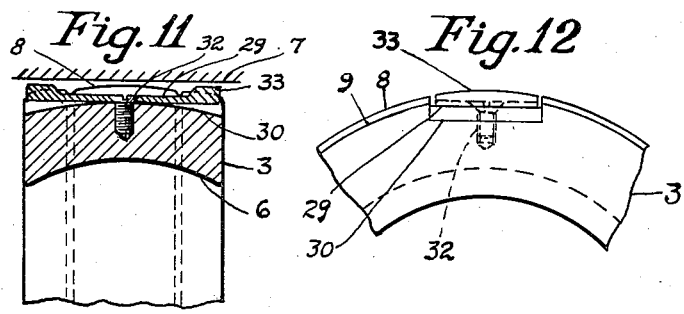
INVENTOR
August Gunnar Ferdinand Wallgren
BY
Wm. J. Hedlund
his ATTORNEY Patented Mar. 26, 1935

1,995,408

UNITED STATES PATENT OFFICE 1,995,408

BEARING

August Gunnar Ferdinand Wallgren, Stockholm, Sweden, assignor to Aktiebolaget Nomy, Stockholm, Sweden, a corporation of Sweden Application May 20, 1932, Serial No. 612,447
In Sweden May 23, 1931

21 Claims. (Cl. 308—73)

My invention relates to bearings and more particularly to radial bearings of the type which are suitable for use in connection with shafts or the like which are subjected to axial or thrust loads, as well as radial loads. The thrust loads imposed by a shaft on the supporting bearings are often of two types. The first type is that produced by, for instance, a gear train. Such a thrust may not be of great magnitude, but it tends to displace the shaft a comparatively great distance in axial direction and hence must be resisted. The second type of thrust is that resulting from variations in the length of the shaft due to temperature variations. This thrust is of great magnitude, but, inasmuch as it tends to displace the bearing only a limited distance, there is no necessity for resisting it.

Heretofore, separate and distinct bearings have been required to cope with these two different types of thrust. Bearings which are now displaceable in axial direction have been employed to resist the first type and floating bearings have been employed to permit shaft expansion. In the event that both types of thrust are present in the same shaft, as they often are, both a fixed and one or more floating bearings must be used.

One of the objects of my invention is to provide a single bearing which offers practically no resistance to thrust loads of the second type while being capable of sustaining thrust loads of the first type.

Further objects and advantages of my invention will be apparent from the following description considered in connection with the accompanying drawings which form a part of this specification and of which:—

Figs. 1 and 2 illustrate a radial block bearing in accordance with my invention, Fig. 1 being a cross sectional view along the line I—I of Fig. 2 and Fig. 2 a cross-sectional view along the line II—II of Fig. 1.

Fig. 3 illustrates the position of the bearing on an axial displacement of the journalled shaft in the direction designated by the arrow.

Figs. 4 and 5 are views of ball and roller bearings, respectively, in accordance with my invention.

Figs. 6, 7, 8, 9 and 10, and 11 and 12 illustrate five different embodiments of my invention.

In the embodiment shown in Figs. 1 to 3, reference numeral 2 designates an inner ring element, called the carrier ring in the following description adapted to be rigidly connected with the journalled shaft 5, and 3 is an outer ring element herein called the bearing race. Arranged between the ring elements is a number of bearing blocks 4 tiltably supported on the carrier ring 2 which is provided, in known manner, with means to carry the blocks along in rotation, as will be described later on. The bearing race 3 is formed with a spherically shaped bearing surface 6 with which the correspondingly shaped bearing surfaces of the blocks co-operate. The stationary bearing race 3 is adapted to be mounted in, for instance, a bearing housing diagrammatically represented in the drawings by the cylindrical surface 7 on which the race 3 bears.

According to the invention the bearing race 3 is formed with a spherically or approximately spherically shaped rolling surface 8, the center of which preferably coincides with that of the shaft. In the embodiment shown the radial load acting on the bearing is assumed to be directed downwardly and thus rolling surface 8 bears on the lower portion of the cylindrical surface 7 of the bearing housing. The spherical surface 8 is formed on the middle portion of the bearing race 3 and is limited by lateral portions 9 of less diameter so as to permit the bearing race to roll with its spherical surface on the surface 7 of the bearing housing. Between the surface 8 of the bearing race and the bearing housing a certain play is provided as indicated in Figs. 1 and 3. In order to facilitate the finishing of the surface 8, grooves 10 are provided at the boundary between the surface 8 and the lateral portions or shoulders 9 of the bearing race. Further, grooves 11 are provided in the lateral portions 9 of the bearing race and engaging said grooves are wire springs 12. The springs 12 have a wave-like formation (Fig. 2) so as to bear against the bottom of the grooves 11 at certain places, but to extend out of the grooves between said places. The springs 12 may either be formed as shown in Fig. 2, that is, with free ends, or the ends may be connected so that the springs form closed rings.

The blocks 4 and the carrier ring 2 are arranged in relation to each other in a manner known per se. Thus, the carrier ring is provided with axially extending grooves 13 and cylindrical surfaces 14, the edges between said grooves and surfaces forming tilting or supporting surfaces $a$ and $b$, the blocks bearing with their supporting surfaces 15 on one or the other of said surfaces according to the direction of rotation. The blocks have a certain limited freedom of peripheral motion between ribs 16 formed on the carrier ring, which ribs carry the blocks along in rotation. On account of this arrangement the blocks will, in both directions of rotation, be so supported that wedge shaped spaces of a height increasing in the direction of rotation are formed between the blocks and the bearing surface 6. In the direction of rotation indicated by the arrow in Fig. 2 the blocks are supported by the supporting surface $a$, whereas on reversal of the direction of rotation they will move in relation to the carrier ring so as to bear on the supporting surface $b$. In order to obtain a guiding action in axial direction between the blocks and the carrier ring 2, grooves 17 are provided laterally of the ribs 16 and engaged by ribs 18 on the blocks. The side walls of the grooves 17 and the surfaces of the ribs 18 bearing on said walls may preferably be arranged obliquely as shown in Fig. 1, whereby considerable axial pressures may be taken up if required. 19 designates rings engaging grooves 20 in the blocks and serving in a manner known per se to prevent the blocks from assuming incorrect positions within the bearing and from falling out of position, if for instance, on mounting the bearing race is turned so as to cause any of the blocks to be wholly disengaged therefrom. The arrangement of the blocks in relation to the carrier ring is previously described in my copending patent application Serial No. 591,467, Pat. No. 1,920,726.

In Figs. 4 and 5 are shown ball and roller bearings in accordance with the invention. In a manner similar to that described above, the outside of the outer ring 3 is provided with a spherical rolling surface 8, and provided laterally of said surface are wires 12 of resilient material engaging grooves 11. Both bearings are provided with spherically shaped supporting surfaces 6 formed on the ring 3 co-operating with balls 21 (Fig. 4) or rollers 22 (Fig. 5). The balls 21 and the rollers 22 are formed and arranged to co-operate with surfaces in contact therewith in a manner known per se so as to obtain an axial guiding of the ring elements 2 and 3 relatively to each other and so as to permit the bearings to take up axial pressures to a certain degree.

The arrangement according to the invention operates as follows:

In the following description it is assumed that the bearing according to the invention is adapted to carry a shaft which at the place where it is journalled is capable of axial movement, for instance due to variations in its length due to variations in temperature. If the shaft 5 in Fig. 3 moves in the direction designated by the arrow 23, the spherical surface 8 of the bearing race 3 will roll on the cylindrical surface 7 on the bearing housing surrounding said race and adjust itself to an oblique position in relation to its original position as indicated in said figure. On account of the spherical shape of the bearing surface 6 and of the corresponding surfaces of the blocks; the shaft 5 will, in spite of the rolling of the bearing race, maintain an unchanged angular position. On account of the curved shape of the rolling surface 8, shaft 5 is, during the rolling motion of the bearing race 3, capable of moving axially, while maintaining the radial position of its center unchanged. If the shaft moves in a direction opposite to the arrow 23 from the position shown in Fig. 3, the carrier ring 2 and the blocks move axially and the bearing race rolls back to its original position.

Such axial displacement of the journalled shaft does not subject the bearing surface to any appreciable additional load. Bearings constructed in accordance with the invention and provided with spherical bearing surfaces have the same advantages with respect to axial shaft displacement as a bearing having cylindrical bearing surfaces, and in addition thereto the advantage, resulting from the spherical bearing surfaces, of being self-aligning, thereby eliminating injurious effects on the oil films between the bearing surfaces due, for instance, to a bent shaft, which is of great importance particularly in block bearings.

The springs 12 have for their object to secure a correct adjustment of the bearing race in the bearing housing on mounting the bearing, namely to ensure the position of the race as shown in Fig. 1. When mounting the bearing race to the surface 7 of the housing, the portions of the springs projecting beyond the lateral portions 9 of the bearing race contact the surface 7, thereby supporting the bearing race with its center line perpendicular to the center of the shaft. The springs also serve to counteract an oblique setting of the bearing race due, for instance to vibrations in the bearing housing or the journalled shaft, and they tend to return the race to its correct position. On the other hand, the springs permit rolling of the bearing race on displacement of the shaft by being compressed into the grooves 9, as shown in Fig. 3.

If desired, the portions 9 of the ring element 3 laterally limiting the spherical rolling surface 8 may be utilized to limit the rolling motion of said ring and thus to limit the axial displacement of the shaft. For this purpose, the portions 9 are shaped so as to come into contact with the surface 7 of the bearing housing at a given angle of oblique setting, thus preventing a further rolling of the ring element and a further axial displacement of the shaft.

In the embodiment shown in Fig. 6, the springs 12 of previous embodiments are replaced by two disks 24, the outer edges of which bear on the walls of a recess 25 formed in the bearing housing and the inner edges of which press resiliently against the sides of the bearing race 3. The disks 24 have the same function as described above with reference to the springs 12, serving, on mounting the bearing race or on accidental oblique setting thereof, to maintain said race in correct position, or return it to such position, while permitting rolling of the bearing race 3 to permit the axial displacement of the shaft. In this embodiment, as in the following ones, the bearing race is formed with a spherical rolling surface 8 co-operating with a cylindrical surface 7 of the bearing housing, in the same manner as previously described.

Instead of wires 12 or disks 24, respectively, a number of spiral springs 27 may be arranged around the periphery of the bearing race. As shown in Fig. 7, said springs may be placed between the sides of the bearing race and the lateral walls of the recess 25 of the bearing housing so as to be compressed in the longitudinal direction of the journalled shaft by an oblique setting of the bearing race. As shown in Fig. 8, they may also be arranged in recesses 28 in the bearing race 3 so as to press against the cylindrical surface 7 of the bearing housing. In the embodiment shown in Fig. 7, the springs 27 may also be arranged in similar recesses in the sides of the bearing race.

In Figs. 9 and 10, an embodiment is shown in which a spring 29 or a plurality of springs 29, are arranged axially across the bearing race 3 engaging grooves 30 extending across the spherical surface 8 of the bearing race. The springs 29, which may be provided at a number of places around the periphery of the bearing race, bear on the bottom of the grooves 30 at the center of said race and are bent outwardly at opposite sides thereof so as to extend out of the grooves. The ends of the springs 29 are bent inwardly into grooves 31 extending peripherically on the sides of the bearing race whereby the springs are maintained in their positions. On an unintentional oblique setting of the bearing race 3, the end portions of the springs 29 press against the surface 7 of the bearing housing, thereby returning the bearing race to correct position.

In the embodiment shown in Figs. 11 and 12, the spring 29 is, as in the embodiment just described, arranged in an axial groove 30 in the bearing race and secured at the center to the race by means of a screw 32. The side of the spring 29 directed towards the bottom of the groove 30 is preferably plane and the groove has an arc-shaped cross section (Fig. 11) to allow inward bending of the spring. In this embodiment, spring 29 is formed at its ends with shoulders 33 which bear against the surface 7 of the bearing housing on an oblique setting of the bearing race. In the embodiments according to Figs. 9 to 12, inclusive, the spherical rolling surface 8 on the bearing race is broken by the grooves 30 in which the springs 29 are placed. For this reason it should be observed that on mounting the bearing race the broken portion of the rolling surface 8 should not be placed in the loaded or highest loaded zone of the bearing.

On account of their construction, bearings of the type described may, if desired, be used also in such cases where axial pressures are to be taken up in a fixed position of the bearing. The sole change required for this purpose consists in mounting the outer ring element 3 in the bearing house without axial play so as to prevent said element from rolling. Thus, bearings according to the invention may be produced in standard sizes together with the rolling surface and spring elements so as to permit their use either as axial guide bearings or bearing permitting axial displacement, as required.

In the embodiments above described, the bearing surfaces 6 have been spherically shaped in order to permit a rolling motion of the outer bearing race while maintaining the same angular position of the journalled shaft. However, if said surfaces are designed in other manner, for instance in the form of a double cone or the like, a spherical guiding surface may be provided at another place of the bearing. For instance, in the embodiment shown in Figs. 1 to 3, the surfaces 15 of the blocks contacting with the carrier ring 2 or the surface 14 of the latter corresponding to said contact surfaces may be formed as a spherical guiding surface.

In other particulars the invention may be varied in several respects without departing from the idea upon which the same is based and may be applied, in addition to the bearings above described, also to bearings of other type, for instance to common sliding bearings provided they are formed with, for instance, spherically shaped bearing surfaces. It is not absolutely necessary that the rolling surfaces 8 are spherical, but they may consist of plane surfaces, for instance by being formed with a sufficient small extension in axial direction, or they may be edge-shaped. It is also possible to arrange the rolling surface within the bearing instead of on the outside of the bearing race.

What I claim is:—

1. Bearing structure comprising an inner rotary member, a plurality of bearing elements adjacent said rotary member, an outer member having an inner bearing surface adjacent said elements and universally movable with respect to said elements, and means to permit and limit movement of said outer member angularly with respect to a plane perpendicular to the axis of rotation.

2. Bearing structure comprising an inner rotary member, a plurality of bearing elements adjacent said rotary member, an outer member having an inner bearing surface adjacent said elements and universally movable with respect to said elements, and a surrounding housing, said outer member and housing having cooperating surfaces permitting and limiting movement of said outer member angularly with respect to a plane perpendicular to the axis of rotation.

3. Bearing structure comprising an inner rotary member, a plurality of bearing elements adjacent said rotary member, an outer member having an inner bearing surface adjacent said elements and universally movable with respect to said elements, and a surrounding housing, said outer member and housing having cooperating surfaces in part spherical and in part non-spherical to permit and limit movement of said outer member angularly with respect to a plane perpendicular to the axis of rotation.

4. Bearing structure comprising an inner rotary member, a bearing element adjacent said rotary member, an outer member having an inner bearing surface adjacent said element and universally movable with respect to said element, a surrounding housing, said outer member and housing having cooperating surfaces permitting and limiting movement of said outer member angularly with respect to a plane perpendicular to the axis of rotation, and resilient means resisting said angular movement.

5. Bearing structure comprising an inner rotary member, a plurality of bearing elements adjacent said rotary member, an outer member having an inner bearing surface adjacent said elements and universally movable with respect to said elements, means to permit and limit movement of said outer member angularly with respect to a plane perpendicular to the axis of rotation, and means for initially mounting said outer member in alignment with said plane.

6. Bearing structure comprising an inner rotary member, a plurality of bearing elements adjacent said rotary member, an outer member having an inner bearing surface adjacent said elements and universally movable with respect to said elements, means to permit and limit movement of said outer member angularly with respect to a plane perpendicular to the axis of rotation, and resilient means for initially mounting said outer member in alignment with said plane.

7. Bearing structure comprising an inner rotary member, a plurality of bearing elements adjacent said rotary member, an outer member having an inner bearing surface adjacent said elements and universally movable with respect to said elements, means to permit and limit movement of said outer member angularly with respect to a plane perpendicular to the axis of rotation, and a plurality of peripherally disposed springs for initially mounting said outer member in alignment with said plane.

8. Bearing structure comprising a carrier ring, a plurality of bearing blocks mounted in said carrier ring, said blocks having outer curved bearing surfaces, an outer member having an inner sliding surface adjacent said blocks and universally movable thereon, and said outer member having an outer curved surface to permit rolling movement of the bearing as a whole and a lateral shoulder for limiting said rolling movement.

9. Bearing structure comprising a carrier ring, a plurality of bearing blocks mounted on said carrier ring, said blocks having outer curved bearing surfaces and inner irregular surfaces, said carrier ring having an irregular surface cooperating with the irregular surfaces of the blocks to cause the blocks to tilt, an outer member having an inner curved sliding surface adjacent said blocks, and means to permit and limit movement of said outer member angularly with respect to a plane perpendicular to the axis of rotation.

10. Bearing structure comprising a carrier ring, a plurality of bearing blocks mounted on said carrier ring, said blocks and said carrier ring having cooperating irregular surfaces for tilting the blocks, said blocks having outer spherical sliding surfaces, an outer member having an inner spherical sliding surface adjacent said blocks, and a housing, said outer member and housing having cooperating surfaces permitting and limiting movement of said outer member angularly with respect to a plane perpendicular to the axis of rotation.

11. Bearing structure comprising a carrier ring, a plurality of bearing blocks mounted on said carrier ring, said blocks and said carrier ring having cooperating irregular surfaces for tilting the blocks, said blocks having outer spherical sliding surfaces, an outer member having an inner spherical sliding surface adjacent said blocks, and a housing, said outer member and housing having cooperating surfaces in part spherical and in part non-spherical to permit and limit movement of said outer member angularly with respect to a plane perpendicular to the axis of rotation.

12. Bearing structure comprising a carrier ring, a plurality of bearing blocks mounted on said carrier ring, said blocks and said carrier ring having cooperating irregular surfaces for tilting the blocks, said blocks having outer spherical sliding surfaces, an outer member having an inner spherical sliding surface adjacent said blocks, means to permit and limit movement of said outer member angularly with respect to a plane perpendicular to the axis of rotation, and means for initially mounting said outer member in alignment with said plane.

13. Bearing structure comprising a carrier ring, a plurality of bearing blocks mounted on said carrier ring, said blocks and said carrier ring having cooperating irregular surfaces for tilting the blocks, said blocks having outer spherical sliding surfaces, an outer member having an inner spherical sliding surface adjacent said blocks, means to permit and limit movement of said outer member angularly with respect to a plane perpendicular to the axis of rotation, and resilient means for initially mounting said outer member in alignment with said plane.

14. Bearing structure comprising a carrier ring, a plurality of bearing blocks mounted on said carrier ring, said blocks and said carrier ring having cooperating irregular surfaces for tilting the blocks, said blocks having outer spherical sliding surfaces, an outer member having an inner spherical sliding surface adjacent said blocks, means to permit and limit movement of said outer member angularly with respect to a plane perpendicular to the axis of rotation, and a plurality of peripherally disposed springs for initially mounting said outer member in alignment with said plane.

15. Bearing structure comprising spaced relatively movable members, a plurality of bearing elements having operative positions between said members, and means to permit and limit movement of one of said members angularly with respect to a plane perpendicular to the axis of rotation.

16. Bearing structure comprising an inner rotary member, a plurality of bearing elements adjacent to said rotary member, an outer member having an inner bearing surface adjacent to said elements and universally movable with respect to said elements, a stationary member around said outer member, said outer member and said stationary member having cooperating surfaces permitting movement of said outer member angularly with respect to a plane perpendicular to the axis of rotation, and resilient means between said outer member and said stationary member acting in a direction parallel to said plane for resisting said angular movement.

17. Bearing structure comprising an inner rotary member, a plurality of bearing elements adjacent to said rotary member, an outer member having an inner bearing surface adjacent to said elements and universally movable with respect to said elements, a stationary member around said outer member, said outer member and said stationary member having cooperating surfaces permitting movement of said outer member angularly with respect to a plane perpendicular to the axis of rotation, and comparatively stiff resilient means between said outer member and said stationary member and spaced a comparatively short distance in axial direction from the center of said bearing, said resilient means acting in a direction parallel to said plane for resisting said angular movement.

18. Bearing structure comprising an inner rotary member, a plurality of bearing elements adjacent to said rotary member, an outer member having an inner bearing surface adjacent to said elements and universally movable with respect to said elements, a stationary member around said outer member, said outer member and said stationary member having cooperating surfaces permitting movement of said outer member angularly with respect to a plane perpendicular to the axis of rotation, and a plurality of comparatively stiff resilient members between said outer member and said stationary member and spaced comparatively short equal distances in axial direction on either side of the center of said bearing, said resilient means acting in a direction parallel to said plane for resisting said angular movement.

19. Bearing structure comprising an inner rotary member, a plurality of bearing elements adjacent to said rotary member, an outer member having an inner bearing surface adjacent to said elements and universally movable with respect to said elements, a stationary member around said outer member, said outer member and said stationary member having cooperating surfaces permitting movement of said outer member angularly with respect to a plane perpendicular to the axis of rotation, and comparatively stiff resilient means between said outer member and said stationary member and spaced a distance in axial direction from the center of said bearing, which distance is substantially less than the outer radius of said outer member, said resilient means acting in a direction parallel to said plane for resisting angular movement.

20. Bearing structure comprising spaced relatively movable members, a plurality of bearing elements having operative positions between said members, one of said members being universally movable with respect to said elements, means to permit movement of said one of said members angularly with respect to a plane perpendicular to the axis of rotation, and resilient means for resisting such angular movement.

21. Bearing structure comprising spaced relatively movable members, a plurality of bearing elements having operative positions between said members, one of said members being universally movable with respect to said elements, means to permit movement of said one of said members angularly with respect to a plane perpendicular to the axis of rotation, and resilient means disposed on either side of said plane for resisting such angular movement in either direction.

AUGUST GUNNAR
FERDINAND WALLGREN.